June 7, 1932. W. F. YEOMAN 1,861,487

ADJUSTABLE HAYRACK CLAMP

Filed Jan. 23, 1931

William F. Yeoman
INVENTOR.

BY Curtis V Bush
ATTORNEY

Patented June 7, 1932

1,861,487

UNITED STATES PATENT OFFICE

WILLIAM F. YEOMAN, OF MONTICELLO, IOWA

ADJUSTABLE HAYRACK CLAMP

Application filed January 23, 1931. Serial No. 510,701.

My invention relates to improvements in adjustable hayrack clamps.

The objects of my invention are:

1. To provide a simple clamp which can be adjusted to various lengths to fit various widths of timbers and which can be easily and economically manufactured;

2. To provide a clamp which can be readily attached to and detached from the timbers of a rack and which can be readily adjusted to various lengths and which will hold securely the timbers embraced therein.

I attain these objects by the means illustrated in the accompanying drawing, in which,—

Similar numerals refer to similar parts throughout the several views.

My clamp comprises an inverted U-shaped body 1, preferably formed of sheet metal, having a pair of arms united by a cross-piece, 1c, formed integral therewith. The arms are formed in channel shape with inwardly extending flanges, 1a, and a plurality of holes, 1b, are punched or drilled in the web connecting the flanges of each arm and these holes are spaced at regular intervals longitudinally of the arms.

The flanges are pressed flat or nearly so, upon the portion of the body connecting the arms so as to seat firmly upon the cross-timbers, 5, of the rack. Bolts, 2, having their upper ends bent outwardly at right angles and formed with small heads, 2a, are seated between the flanges of the arms of the body, 1, and the heads, 2a, are slightly larger than the holes, 1b.

At the lower end the bolts, 2, are threaded and provided with nuts, 2b, which are correspondingly threaded to fit thereon. A plate, 3, provided with holes, 3a, is fitted upon the lower ends of the bolts, 2.

An intermediate plate, 4, having eyes, 4c, formed therein, is slidingly mounted upon the body, 1, the eyes, 4c, being enough larger than the body, 1, to slide freely thereon when not otherwise secured. Two opposite ends of the intermediate plate, 4, are flanged upwardly at 4a, and corresponding flanges, 4b, are turned downwardly from the other two edges of the plate, 4.

A stud, 4d, may be attached to the center of the plate, 4, or formed integral therewith. The flanges, 4a and 4b, extend at right angles to each other and obliquely with reference to the cross piece, 1c.

Figure 1:
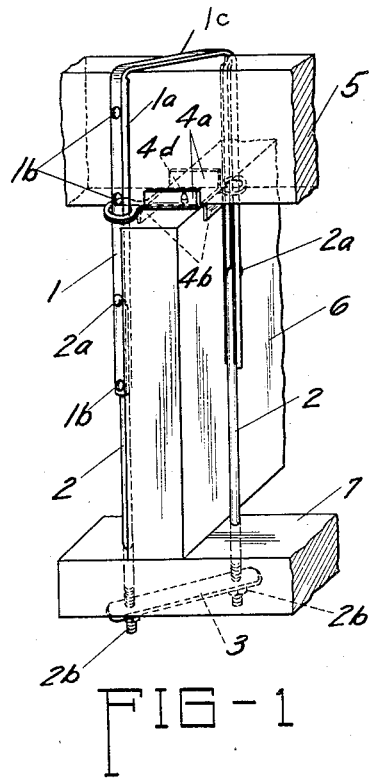
Figure 1 shows my clamp applied to the timbers of a hayrack.
Figure 2:
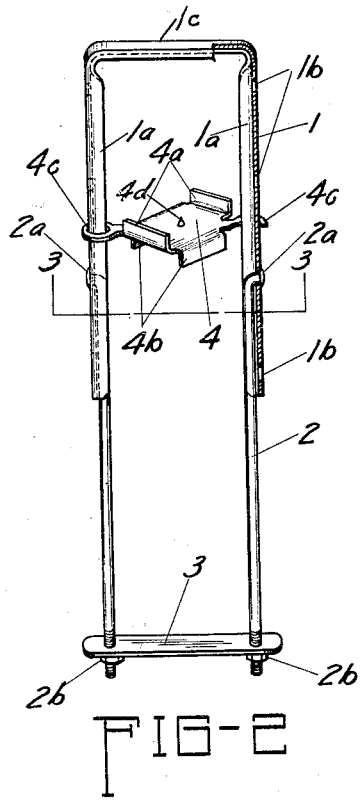
Figure 2 is a perspective side view of my clamp detached from the timbers with one of the flanges broken away to show one of the bolts secured therein.
Figure 3:
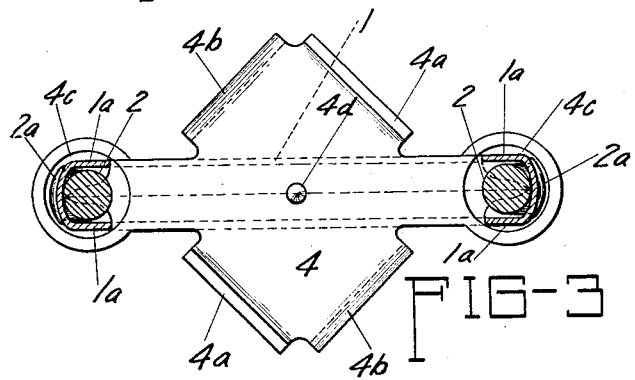
Figure 3 is an enlarged sectional view on the line 3—3 of Figure 2.
Figure 4:
Figure 4 is an enlarged detail of the bottom or tie plate.
Figure 5:
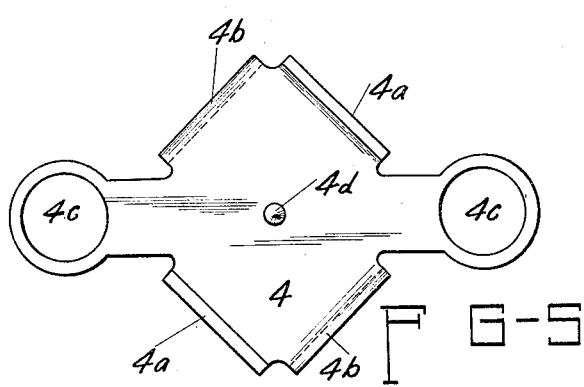
Figure 5 is an enlarged detail of the intermediate plate.

The clamp is shown in assembled form in Figures 1 and 2. In order to disassemble it, the nuts, 2b, are removed and the plate, 3, can then be taken off and the body of the clamp and the bolts, 2, may then be raised until they clear the timbers, 5, 6 and 7. The plate, 4 can then be removed from between the timbers, 5 and 6. To assemble the clamp and rack, the cross pieces, 7, are placed upon suitable supports and the sills, 6, placed edgewise thereon and transversely thereof. The plates, 4, are then placed upon the upper edges of the sills, 6, in the desired position and the cross timbers, 5, are then placed upon the upper faces of the plates, 4.

The bolts, 2, and body of the clamp are put together by running the threaded end of the bolt, 2, through the desired opening, 1b, until the head, 2a, is brought into juxtaposition with the body, 1, and the bolt lies in the channeled arm as shown in Figure 2. The bolts, 2, and the body, 1, are then placed astride of the assembled timbers as shown in Figure 1, the plate, 3, placed upon the lower end of the bolts and the nuts, 2b, tightened to the proper point.

I claim:

A rack-clamp comprising an inverted U-shaped body having channeled arms, a plurality of spaced openings in the arms, a bolt adapted to seat in each arm, a lateral extension with a head thereon formed upon each bolt and extending through one of the openings in the adjacent arm, the opposite end of each bolt being threaded, a rectangular flanged plate slidably mounted upon the arms, oppositely turned flanges formed upon alternate edges of the flanged plate, said flanges extending obliquely of the clamp, a tie-plate slidingly mounted upon the bolts and nuts threaded upon the threaded ends of the bolts.

In testimony whereof he affixes his signature.

WILLIAM F. YEOMAN.